United States Patent
Chang (10) Patent No.: US 7,287,242 B2
(45) Date of Patent: Oct. 23, 2007

(54) EFFICIENT RE-VALIDATION OF MODIFIED SOFTWARE

(75) Inventor: Henry Chang, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 839 days.

(21) Appl. No.: 10/653,472

(22) Filed: Sep. 2, 2003

(65) Prior Publication Data

US 2005/0050521 A1 Mar. 3, 2005

(51) Int. Cl.
*G06F 9/44* (2006.01)

(52) U.S. Cl. .......................... 717/124; 714/31; 714/32; 714/33; 714/37; 714/38

(58) Field of Classification Search ...................... None
See application file for complete search history.

(56) References Cited

U.S. PATENT DOCUMENTS 5,615,333 A * 3/1997 Juettner et al. ............... 714/38
5,651,111 A * 7/1997 McKeeman et al. .......... 714/38

* cited by examiner

*Primary Examiner*—Wei Zhen
*Assistant Examiner*—Phillip H Nguyen (57) ABSTRACT

An automated software re-testing system for efficiently validating proper operation according to a specification. Regression tests are automatically created in an object-oriented system. The inheritance hierarchy of the system is used to determine which system classes should be tested. Regression test class destructors are used to test dependent classes. Unchanged system classes, and those dependent entirely on unchanged system classes need not be tested and time and effort are saved by skipping their re-testing.

19 Claims, 3 Drawing Sheets

EFFICIENT RE-VALIDATION OF MODIFIED SOFTWARE

FIELD OF THE PRESENT INVENTION

The current invention relates to the building and testing of computer software systems in general, and more specifically to the development of regression test programs in an object-oriented software system.

BACKGROUND

Computer systems use software applications to execute particular actions and responses. This almost always includes a formal specification for both the hardware and software. Such require testing to verify proper processing.

Traditionally, software testing follows a well-know sequence, the design of the software system is dictated by a specification of the system's, appearance, interaction, and results. Such specification is the basis for programming of the software that implements the system. The software is then tested against its specification, and any discrepancies between designed and actual operation are corrected and re-tested. Such cycle of test and change is repeated until the operation of the system is correct as specified. Software development necessitates that every change be tested, so the cycle of test-change-test is repeated until no further changes are required, that is, until the test verifies the specified.

In the competitive business environment, it is often the case the company first to market with the complete system, designed, programmed, tested, and delivered, has the competitive advantage. Thus, the efficient testing of a software system is vital to the commercial success of a software system.

Many computer systems give service beyond their original specification. Computer systems that are successful are modified over time to be responsive to changes in requirements, environment, application, preferences, or to correct errors found after initial test verification. In these cases, the system is changed and tested against the new specifications. Ideally, the software system is verified against the full specification, not just the changed parts.

In large systems, the time needed to re-test the entire system may be prohibitive, e.g., several months. An exhaustive re-test of the entire system for each change, while giving the greatest confidence of a correct system, may not be practical. An efficient test strategy is desirable, one that is comprehensive, accurate, and responsive to changes, and provides a competitive advantage.

What is needed is a system for identifying which classes of an object-oriented system require testing. For example, an automated method for creating test programs that test for changed or dependent classes in an optimal sequence.

SUMMARY OF THE PRESENT INVENTION

Embodiments of the present invention provide an automated means for determining the degree of test coverage of an object-orientated software system by identifying all classes that have been changed.

It is an object of some embodiments of the present invention to test those software classes that have themselves changed or that depend on any changed classes.

It is another object of embodiments of the present invention to provide an automated means for identifying the classes to be tested based on the class hierarchy of the object-oriented system.

It is a further object of embodiments of the present invention to provide a way to automatically invoke the desired tests in an order determined by the class hierarchy.

It is another object of embodiments of the present invention to provide a means for automatically generating the programs that test the identified classes.

Briefly, an automated software re-testing system provides for efficient validation of proper operation according to a superceding specification. Regression tests are automatically created in an object-oriented system. The inheritance hierarchy of the system is used to determine which system classes should be tested. Regression test class destructors are used to test dependent classes. Unchanged system classes, and those dependent entirely on unchanged system classes need not be tested and time and effort are saved by skipping their retesting.

BRIEF DESCRIPTION OF THE DRAWINGS

FIG. 1 is a block diagram of a simple class hierarchy;

FIG. 2 is a flowchart diagram a process embodiment of the present invention for testing the effects of changes and conformance of a modified software program to its controlling specifications; and FIG. 3 is a block diagram showing the interrelationships of constituent parts of one embodiment of the present invention.

DETAILED DESCRIPTION OF EMBODIMENTS OF THE PRESENT INVENTION

Figure 1:
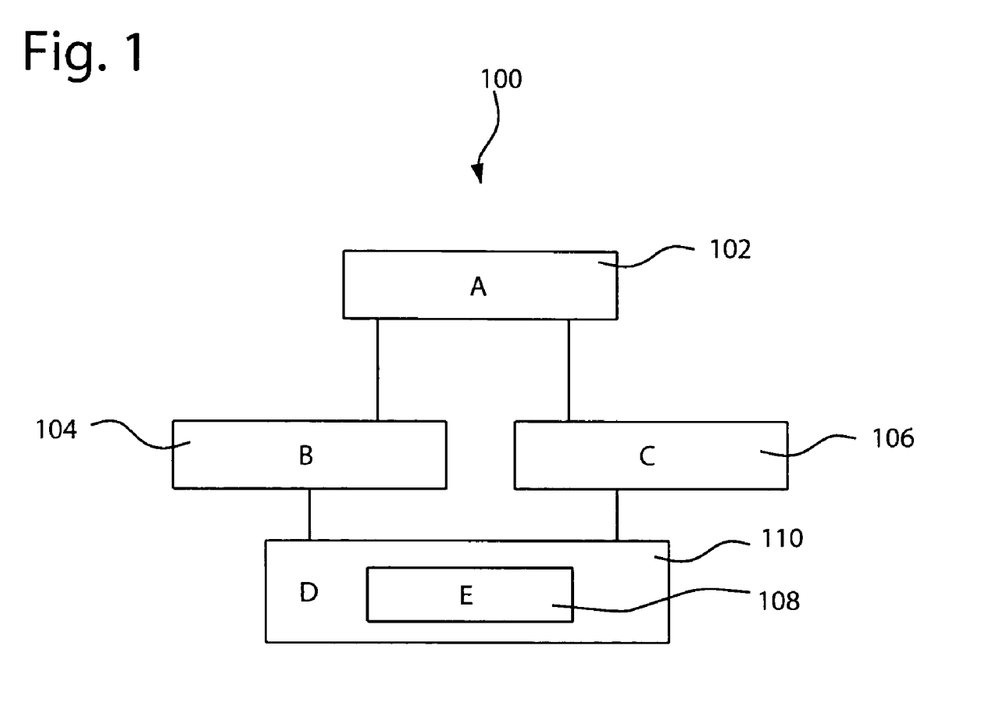

An object-oriented software system comprises a number of related classes, e.g., "system classes". Instances of the classes called "objects" are created, modified, and destroyed while processing. Such objects communicate with other objects to complete a particular-application. If the software is modified, changes will occur in the code representing the system classes. Referring now to FIG. 1, a simple hierarchy 100 comprises five classes, e.g., labeled "A" 102 through "E" 110, referred herein as "class-A" through "class-E". Relationships between the classes are represented by the lines in the drawings between the classes. In the hierarchy 100, class-A 102 is the base class-for class-B 104 and class-C 106; that is, class-B and class-C are inherited from class-A. Similarly, class-D 108 is inherited from both class-B 104 and class-C 106, and contains class-E 110.

If class-A 102 is changed, it will be necessary to test class-A. It is also necessary to test any classes that inherit from class-A, namely, class-B 104 and class-C 106. The classes that inherit from class-B 104 or class-C 106 need to be tested too. In FIG. 1, such includes testing class-D 108. Since class-E 110 is fully contained in class-D 108, a test of class-E separate from class-D is not necessary.

There are many strategies available for testing computer systems. These include a comprehensive re-test of the entire system at each change to the isolation and re-test of the changed components of the system. For each change to software system the best test strategy to use has to be decided.

An "object-oriented" programming language includes object "classes" and relationships between classes. These relationships generally fall into "inheritance", one class is a kind of another class, for example, a student is a kind of person, and "aggregation", one class is a part of another, for example, a sail is a part of a sailboat. The programming language allows for the specification of these class relationships as part of the language coding conventions. Such languages include C++, Java, Smalltalk, and others. Inspections of the software system source code will reveal the class hierarchy.

Classes include not just relationships, but also object attributes and methods. For example, a "student" object will have attributes such as "course" and "course grade", and methods such as "register in course" and "assign grade". When a class inherits from another class, what it inherits are the attributes and behaviors of the class. A "student" is also a "person", and has the attributes of a person, for example, "age" and "gender". Again, the language structures allow for the specification of the attributes and methods of the software classes, and an inspection of the source code of the system will reveal the details of each class and the inheritance sequence.

One key concept of an object-oriented system is a class's "construction sequence", that is the order in that an instance of a class is created and populated with attributes and activated with methods. For example, a student object is also a person object, so the construction sequence first builds the person object and populates it with person attributes. The person object is made a student object by adding or changing attributes and methods that make the student object different from the person object. A class "constructor" does the work of allocating memory, initializing field values, etc., for each class.

Constructors and destructors are special class methods. A constructor is called whenever an object is newly defined or dynamically allocated using the "new" operator. The purpose of a constructor is to initialize data members and sometimes to obtain resources such as memory, or lock on a shared resource. An object's destructor is called whenever an object goes out of scope or when a "delete" operator is called on a pointer to the object. Destructors are used for clean up, e.g., to free memory and to release any locks or mutexes on system resources.

A constructor is a method that has the same name as its class. A destructor is a method that has as its name the class name prefixed by a tilde, . Neither constructors nor destructors return values. They have no return type specified. Constructors can have arguments, and can be overloaded. If a constructor is written for a class, the compiler will not generate a default constructor. The default constructor is a constructor with no arguments, or a constructor that provides defaults for all arguments.

The container classes, such as vector, require default constructors to be available for the classes they hold. Dynamically allocated class arrays also require a default constructor. If any constructors are defined, you should always define a default constructor as well. Destructors have no arguments and thus cannot be overloaded.

A "construction sequence" for each class, so that when a "new" student object is created, it is first created as a "person" then made a "student". Similarly, when the software program are in some sense "done" with an object it is deleted, freeing any resources used, etc., it follows a "destruction sequence". Such sequence is the reverse of the construction sequence.

Thus to delete a student object, a "destructor" program for the student class is called to delete the student object, a process that essentially changes it back to a person object. The destructor for the person class is then called to delete the person object.

The testing of object-oriented software system includes the identification of the changes to the system in four areas:

1) changes to the class relationships, 2) changes to class attribute definitions, including size, length, default values, etc., 3) changes to class methods, including the addition of new methods, and 4) changes in the use of an instance of a class (an object) by another object. Tests are then created to test the changed classes in an optimal order.

The following example shows a sequence of tests based on that class is changed and the hierarchy of the software system:

| If this class is changed: | These classes in order must be tested: |
| --- | --- |
| Class-A | A then B then C then D (not E). |
| Class-B | B then D (not A, C, or E) |
| Class-C | C then D (not A, B or E) |
| Class-D | D (not A, B, C, or E) |
| Class-E | E then D (not A, B or C) |

In the case of a change to class-A, the order of testing B and C is not important. In the case of a change to D, class-E is fully contained in class-D and does not should be tested separately. A change to class-E, however, will require that class-D be tested.

Table I illustrates a C++ implementation of the example classes of FIG. 1. A "Person" class corresponds to class "A". The two "Teacher" and "Student" classes are a type of "Person" and correspond to class-B and class-C respectively. The "TA" (Teaching Assistant) class has qualities of both a "Teacher" and a "Student" and corresponds to class-D in FIG. 1. Not shown is class-E of FIG. 1.

TABLE I

```
// School.h
#ifndef __School__
#define __School__
class Person {
public:
    void person_func1( );
    void person_func2( );
};
class Teacher: public Person {
public:
    void teacher_func1( );
    void teacher_func2( );
};
class Student: public Person {
public:
    void student_func1( );
    void student_func2( );
};
class TA: public Teacher, public Student {
public:
    void ta_func1( );
    void ta_func2( );
};
#endif // __School__
```

When testing object-oriented software systems, it is customary to create programs to test each of the classes of the system. Such takes the form of a test class for each system class. For example, the "Person" class comprises twos,

```
class Person {
public:
    void person_func1( );
    void person_func2( );
};
```

The class that would be written to test the Person class, say class "testPerson", would have a that tests each of these of the Person class. For example,

```
class testPerson: public testClass {
public:
    void test_person_func1( ) { }
    void test_person_func2( ) { }
};
```

The "test_person_func1" is a that when called tests one aspect of the Person system class. Similarly, "test_person_func2" tests another aspect of the Person system class. In general, the "testPerson" class includes at least one tests to test the Person system class.

Table II represents a hierarchy testing set, e.g., as shown in Table I. Each test class comprises a test for each of the system classes. It also includes a "testAll" that will run each of the tests, providing inputs as necessary, and reporting the correct processing of the system or writing messages in the case of any exceptions. The processing of the "testAll" for a test class will run all tests of the corresponding system class. The processing of each of the "testAll"s will thus run a complete test of the system. When a new system classes is added, a corresponding test class is added to the test hierarchy. The test class will have corresponding tests for each of the system class processing. It will also have a testAll class to perform all the tests needed to verify the correct processing of the system class. Over time, as a system class changes, the corresponding test class would change to test the new and changed system class.

If a system class is deleted, the corresponding test class would also be deleted. If a new system class were added, a corresponding test class would also be added. In practice, the scope and extent of the testing of a system class is determined by the programmers and test programmers involved.

TABLE II

```
class testClass {
public:
    virtual void testAll(int silentFlag=0) = 0;
};
class testPerson: public testClass {
public:
    void test_person_func1( ) { }
    void test_person_func2( ) { }
    void testAll(int silentFlag=0) {
        cout << " Test all on class Person" << endl;
    }
    void dispTestCasesInfo( ) {
        cout << "Display test casses info for class Person" << endl;
    }
};
class testTeacher: public testClass {
public:
    void test_teacher_func1( ) { }
    void test_teacher_func2( ) { }
    void testAll(int silentFlag=0) {
```

TABLE II-continued

```
        cout << " Test all on class Teacher" << endl;
    }
    void dispTestCasesInfo( ) {
        cout << "Display test casses info for class Teacher" << endl;
    }
};
class testStudent : public testClass {
public:
    void test_student_func1( ) { }
    void test_student_func2( ) { }
    void testAll(int silentFlag=0) {
        cout << " Test all on class Student" << endl;
    }
    void dispTestCasesInfo( ) {
        cout << "Display test casses info for class Student" << endl;
    }
};
class testTA: public testClass {
public:
    void test_ta_func1( ) { }
    void test_ta_func2( ) { }
    void testAll(int silentFlag=0) {
        cout << " Test all on class TA" << endl;
    }
    void dispTestCasesInfo( ) {
        cout << "Display test casses info for class TA" << endl;
    }
};
```

A method embodiment of the present invention creates "regression test" classes that call the test classes to test the system classes. The system classes perform a particular-application, and test classes are created specifically to test the system classes. The regression test classes invoke the test classes. For example,

```
class regTestA: virtual public regTestB,
                virtual public regTestC {
public:
    ~regTestA( ) { cout << "regression test on class A" << endl;
        testA obj;
        obj.testAll( ); }
};
```

The "regTestA" includes a "regTestA" that writes a message and then invokes the "testAll" of the "testA" class, that in turn will test each of these of system class "A". A regression test is created for each test class. example, the notation for the programming language C++ is used. The "regTestA" is a "destructor", called automatically by the object-oriented software environment when an object of the "regTestA" class is explicitly deleted, or at the end of processing to delete any active objects. While C++ notation is used, each of the object-oriented languages has a notation for destructors and will call the destructor explicitly or implicitly at the end of processing. Each regression test class declares as a virtual public of each dependent class, as is common in the art of C++ programming.

Some object-oriented programming languages like Java do not have a built-in construction/destruction order as does C++. In these languages, well-known alternatives can be used to implement the classes code similar to C++'s construction/destruction order. Embodiments of the present invention do not dependent on the implementation means, the means for constructing and destructing objects of classes, or the destruction sequence being the reverse of the construction sequence. Such requirements are satisfied in many conventional object-oriented languages.

Executing the destructor for class "regTestA" will cause the destructor for "regTestB" to also be run at the completion of the destructor for "regTestA".

The regression test classes can be created by, For each test class:

```
Output = Empty
Add to output: class reg ∥ testclassname
If class has dependent classes:
    Add to output: :
    For each dependent class
    Add to output: virtual public ∥ dependentclassname
    Next dependent class
Endif
Add to output: {
Add to output: ~reg ∥ testclassname ∥ ( ) {
Add to output public:
    ~regTestStudent( ) { cout << "regression test on class
Student" << endl;
Add to output: test ∥ systemclassname ∥ obj;
Add to output: obj.testAll( ); }
Add to output: };
Write output
Next test class
```

The "testclassname" is a name of each test class, "dependentclassname:" is the name of classes dependent on the test class being processed, and "systemclassname:" is the name of the corresponding system class to the test class being processed. The symbol "∥" is the concatenate operator.

At the end of the processing of this logic, each regression test class has been created and written. An example of the output of this process is shown in Table III.

TABLE III

```
class regTestTA {
public:
    ~regTestTA( ) { cout << "regression test on class TA" << endl;
        testTA obj; obj.testAll( ); }
};
// -    Class TA uses class Student because class TA is
inherited
//         from class Student.
//         // - regTestTA is declared as virtual base class so
that regression test
//         on class TA is done once.
        class regTestStudent : virtual public regTestTA {
public:
    ~regTestStudent( ) { cout << "regression test on class
Student" << endl;
        testStudent obj; obj.testAll( ); }
};
// -    Class TA uses class Teacher because class TA is
//         inherited from class Teacher.
//         // - regTestTA is declared as virtual base class so
that regression test on
//         class TA is done once
class regTestTeacher: virtual public regTestTA {
public:
    ~regTestTeacher( ) { cout << "regression test on class
Teacher" << endl;
        testTeacher obj; obj.testAll( ); }
};
// -    Class Teacher uses class Person because class Teacher
//         is inherited from class Person.
// -    Class Student uses class Person because class Student
//         is inherited from class Person.
// -    Since regTestTeacher is destructed after
regTestStudent,
```

TABLE III-continued

```
//         the class Student will be tested before class
Teacher.
        class regTestPerson: public regTestTeacher, public
regTestStudent {
public:
    ~regTestPerson( ) { cout << "regression test on class
Person" << endl;
        testPerson obj; obj.testAll( ); }
};
#endif // __regTestSchool__
```

Running each of the test class testAlls will fully test the system, testing each of each class. Such may not be desirable, as it is considered unnecessary to test a class that does not change. If the system is large, a complete test may be very expensive in time and effort. It is therefore desirable to identify those classes of the system that have changed, and then identify the classes dependent on the changed classes. Since changes to the classes will be detected by an inspection of the programs comprising the classes, the process of change detection can be automated. For example, by inspecting the date of last change, or if the prior versions of the code are available, then by comparing the current and previous program source code. Such process can be automated with,

TABLE IV

```
Set baseline date stamp (to find changes since this date /
time)
Changed_list = Empty
For each class:
Compare change date stamp against baseline date stamp
If changed
    Add class to Changed_list
End if
Next class
```

A comparison of a baseline source code of the class programs to the current source code can be used to detect changes.

The identification of changed classes can use any of a number of techniques. Current art has a mechanism to detect a changed code and act accordingly called "make". A "make" requires a "Makefile". For example, a "Makefile" with this content:

```
all: OBJ1 OBJ2
OBJ1: file1
    compile file1
OBJ2: file2
    compile file2
```

During the "make" process, the make tool checks whether file1 is changed, if it is changed, the command "compile file1" will be executed to generate "OBJ1"; if "file1" is not changed, nothing will be done. Similarly, "make" checks whether file2 is changed, if it is changed, the command "compile file2" will be executed to generate "OBJ2". Thus "make" can be used to identify and collect all changed system classes. Other techniques are available using other tools.

When all classes have been examined, the array "Changed_list" will include all classes changed since the baseline date stamp.

Given a list of changed classes for a hierarchy, any classes that should be tested and the sequence of their test is determined, as shown by Table V.

TABLE V

```
Output = Empty
Add to output: #include "regTestSchool.h"
Add to output: #include "iostream.h"
Add to output: void main( ) {
For each changed class:
    Add to output: {
    Add to output:    cout << "Regression Test on class " <<
classname
    Add to output:    << endl;
    Add to output:        regTest || classname || obj;
    Add to output: }
Next class
Add to output: }
Exit
```

Where "classname" is the name of the changed system class, and "||" is a concatenate operator.

The array "output" contains the regression test program to be run to test the changed and dependent system classes in the optimal order. Refer to Table VI for a sample of the output of this process.

TABLE VI

```
include "regTestSchool.h"
#include
void main( ) {
    //Example 1: If class Person is modified, we would
like to run a
    // regression test on class Person. The sequence of
the tests
    // are:
    //    Example 1: Regression Test on class Person
    //       regression test on class Person
    //          Test all on class Person
    //       regression test on class Student
    //          Test all on class Student
    //       regression test on class Teacher
    //          Test all on class Teacher
    //       regression test on class TA
    //          Test all on class TA
    {
        cout << "Example 1: Regression Test on class Person"
<< endl;
            regTestPerson obj;
    }
    // Example 2: If class Teacher is modified and we would
like to run a
    // regression test on class Person. The sequence of
the tests
    // are:
    //    Example 2: Regression Test on class Teacher
    //       regression test on class Teacher
    //          Test all on class Teacher
    //       regression test on class TA
    //          Test all on class TA
    {
        cout << "Example 2: Regression Test on class
Teacher" << endl;
            regTestTeacher obj;
    }
}
```

Figure 2:
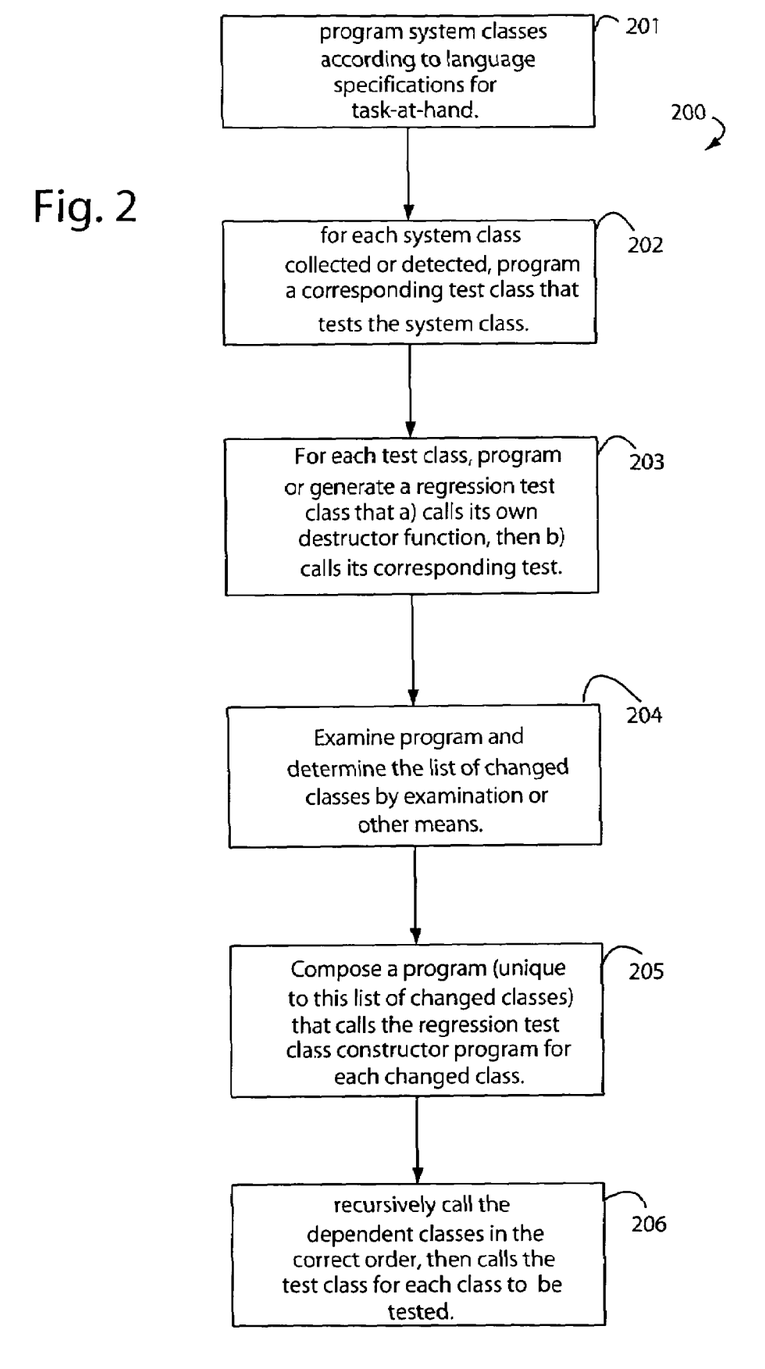

FIG. 2 illustrates a test method embodiment of the present invention for limiting software testing to changed and dependent classes. Such is method referred to herein by the general reference numeral 200. A step 201 represents object-oriented programming of a software system, e.g., using the language specifications to implement a particular-application. In a step 202, for each system class, a test class is written for testing the attributes and behaviors of the objects in each class. These test classes may include any number of program calls to the system classes, that is, invocations of system classes. For example, a system class that displays a 0-100 range might have a test class written that tries a suite of four numbers {0, 100, −1, 101, and 50} to test the extreme correct values, then two tries outside and one inside the range.

The purpose of these test classes is to test the system class and report any successes or failures. The programmer may change the test classes over time to test new and changed attributes and behaviors of the system, or to adjust the effort expended on the system classes. In a step 203, a regression test class is automatically created for each test class, and thereby for each system class. The step of creating the regression test classes is automated as described in example-1 in Table-VI. In a step 204, a list of changed system classes is constructed. This list can be built at any time, e.g., during system development, or at various checkpoints or at the completion of programming. Such step is automated using example-2 in Table-VI. In a step 205, a program is automatically created unique for each list of from step 206. Such program, for each class to be tested, calls the corresponding regression test class destructor, then the corresponding test class constructor. Calling the destructor will cause any dependent classes to be called in the necessary and optimal order. In a step 206, test program step 205 is used to recursively tests all the selected classes and any dependent classes.

Figure 3:
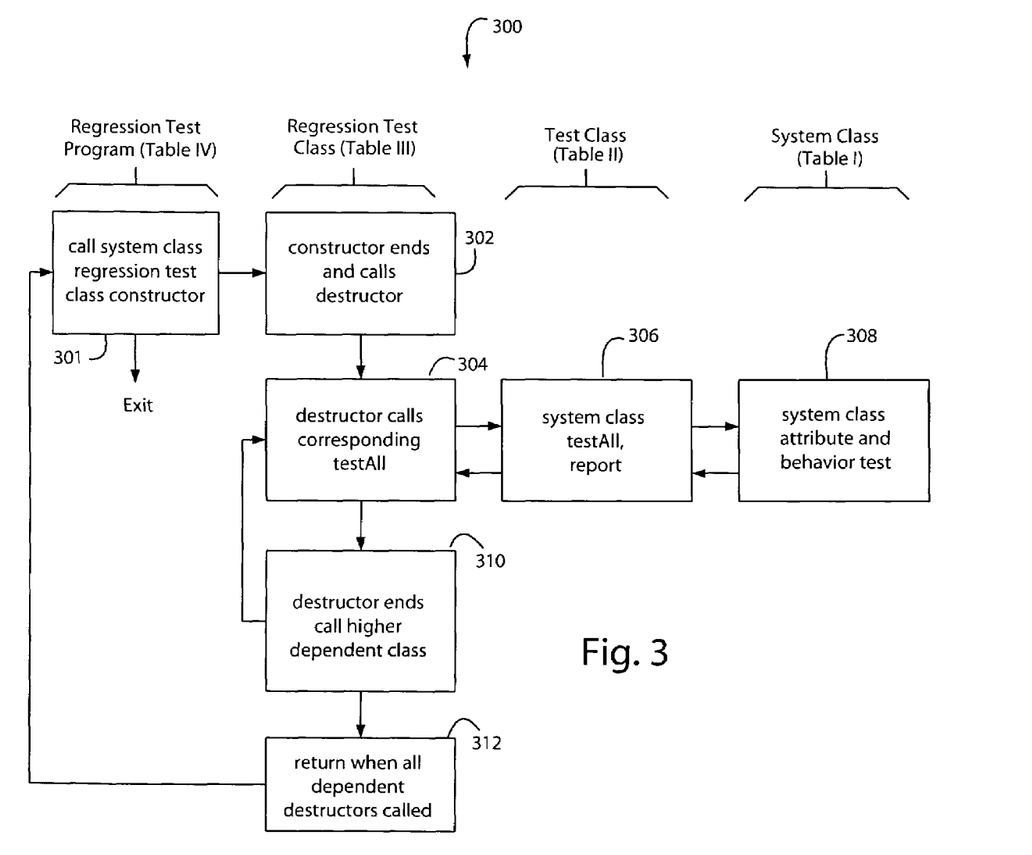

FIG. 3 illustrates the steps performed by a software embodiment of the present invention, which is referred to herein by the general reference numeral 300. A first part uniquely and automatically creates regression test programs to test a set of system classes. A second part automatically generates regression test classes, one for each test class and system class. A third part generates test classes, one for each system class, to test the attributes and behaviors of corresponding system classes. And a fourth part executes system classes, which are designed and written to implement the particular-application. Such system classes and the test classes are coded by programmers. The regression test classes and the regression test program are automatically generated.

Referring now to FIG. 3, beginning with a step 301, the regression test program is run, and it executes a first or next regression test class, invoking its constructor. In a step 302, the regression test class constructor immediately ends, that causes the class's destructor to be called. In a step 304, the destructor calls the corresponding test class "testAll". Continuing in a step 306, the test class "testAll" exercises the system class by invoking various system class, then examining the results and reports success or failure of the test. Each call to a system test causes the flow to continue with step 308, wherein the system test programs are run and results returned to the "testAll".

Alternatively, the "testAll" can be run by a human operator who inspects the system test class output and determines success or failure. When the "testAll" of step 306 has complete all of its tests, it returns to step 304, completing the execution of the destructor. Continuing in a step 310, when a destructor completes, the object-oriented system causes any dependent class destructors to be called in hierarchy order, lowest to highest. Thus in a step 310, if the regression test class is dependent on another class, that class's destructor is called. Processing continue in a step 304 for a higher-level regression test class. In this way, flow continues through steps 304, 306, 308, and 310 recursively until a class is found that is independent of other classes. Processing continues with a step 312, wherein the destructors of all dependent classes are completed, and processing returns to the regression test program at step 300. Here, if there are calls to regression test class constructions to test more classes, processing continues. If there are no more calls, processing ends in step 301 and the test run completes. The output of the test classes, or the notes of a user, are consulted and the test results are reported.

All the classes that are affected by the change are tested and no others. The process is direct and automated and provides the optimum test coverage and sequence.

While FIG. 1 represents a simple hierarchy of five classes, embodiments of the present invention can include more complex hierarchies. Such can be applied to any object-oriented software system. The resulting test sequence is complete, testing all changed classes, and optimized, testing the changed classes in the correct order. Over time, as new classes and new methods are added, removed, or changed, the tests (e.g., Table II) are changed to fully test each system class. The regression test classes (e.g., Table III) should be changed as classes are added or removed, or if class dependencies change. The regression test program (e.g., Table IV) needs to be changed to test modified system classes.

In alternative embodiments of the present invention, the destructors of an object-oriented system cause dependent class destructors to be called in the correct order for regression testing. While the examples here are shown written in C++, the destructor sequence can be used for optimal regression testing could be coded in other object-oriented programming languages.

What is claimed is:

1. An automated software re-testing method, comprising:
dividing a modified application software into a first set of system classes that have been individually modified, and a second set of system classes that have not been modified since a last validation of software performance to a former software specification;
grouping any dependent system classes that depend even in part from said first set of system classes into a first group, and any dependent system classes that are independent of any of said first set of system classes into a second group;
creating a test class for each system class of the second set of system classes;
automatically creating regression test class for each test class;
generating and running regression test constructors and destructors for a report of an operational conformance of said modified application software to a present superceding software specification;
generating the report of the operational conformance of said modified application software by the regression test constructors and destructors; and
calling a test by the regression test class for each test class to test the second set of system classes.

2. The method of claim 1, further comprising:
defining a set of system classes for a particular-application;
defining a corresponding test class for each system class;
automatically creating regression test classes and a regression test program for testing system classes that have changed from an original or that depend on changed classes;
calling corresponding test class and recursively calling all dependent classes from a regression test class;
automatically inspecting said set of system classes for changes; and
calling said regression test class for each changed system class.

3. The method of claim 1, further comprising:
calling a test for said system class; and
automatically creating a first regression test class to call a test of a corresponding test class and creating subsequent regression test classes to call a test of corresponding test classes.

4. The method of claim 1, further comprising:
examining an object-oriented software system for a change in at least one attribute selected from the group comprising date stump, source code, size, or check sum.

5. The method of claim 1, further comprising:
calling a regression test class constructor of the regression test class corresponding to a changed system class.

6. A computer readable medium on which is encoded an object-oriented software system, comprising:
a set of system classes that implement a task, wherein the set of system classes include a modified application software divided into a first set of system classes that have been individually modified, and a second set of system classes that have not been modified since a last validation of software performance to a former software specification, and any dependent system classes that depend even in part from said first set of system classes are grouped into a first group, and any dependent system classes that are independent of any of said first set of system classes are grouped into a second group;
creating at least one test class for the set of system classes;
a first generator automatically creating at least one regression test class for the at least one test class, wherein the regression test classes include regression test class constructors and destructors;
a program automatically inspecting the set of system classes and selecting at least one changed system class, wherein the regression test classes call the test classes to test the system classes corresponding to the at least one changed system classes, and wherein the regression test classes include regression test class constructors and destructors;
a second generator automatically creating a regression test program for calling regression test classes corresponding to the at least one changed system classes, wherein the regression test classes include regression test classes constructors and destructors; and
a third generator generating and running regression test constructors and destructors to generate a report of an operational conformance of said modified application software to a present superceding software specification.

7. The computer readable medium of claim 6, further comprising:
at least one test class corresponding to a system class, having a test which when called tests the system class.

8. The computer readable medium of claim 6, wherein:
the first generator for automatically creating at least one regression test classes creates a first regression test class to call the test of a corresponding test class and creating subsequent regression test classes to call the test of corresponding test classes.

9. The computer readable medium of claim 8, wherein:
the regression test class destructor recursively calls a regression test destructor of a dependent regression test class.

10. The computer readable medium claim 8, wherein:
the first generator calls the regression test class destructor, and calls the test of a test class.

11. The computer readable medium of claim 6, wherein:
the program for automatically inspecting the set of system classes examines the object-oriented software system for a change in at least one attribute selected from the group comprising date stamp, source code, size, or check sum.

12. The computer readable medium of claim 6, wherein:
the second generator calls a regression test class constructor of a regression test class corresponding to a selected system class.

13. A method for automated testing of object-oriented software, comprising the steps of:
collecting a list of all classes in an object-oriented software program by dividing the object-oriented software program into a first set of system classes that have been individually modified, and a second set of system classes that have not been modified since a last validation of software performance to a former software specification, and grouping any dependent system classes that depend even in part from said first set of system classes into a first group, and any dependent system classes that are independent of any of said first set of system classes into a second group;
creating a test class for each class in the list;
generating regression test classes for each test class, wherein generating regression test classes includes calling regression test class constructors and destructors;
examining the object-oriented software program for changed classes and compiling a list of them, wherein examining the object-oriented software program includes using test cases run by the regression test classes;
creating a regression test program for calling regression test classes corresponding to the at least one changed system classes, wherein the regression test classes include repression test classes constructors and destructors; and
generating and running repression test constructors and destructors to generate a report of an operational conformance of said object-oriented software program to a present superceding software specification.

14. The testing method of claim 13, wherein the generating regression test classes for each class collected further comprises to steps of:
calling a regression test class destructor for each class collected; and
calling a test case.

15. The testing method of claim 13, wherein examining the object-oriented software program for changed classes further comprises:
examining the object-oriented software program for a change in at least one attribute selected from the group comprising date stamp, source code, size, or check sum.

16. The testing method of claim 13, wherein composing a test program for testing the changed classes further comprises the steps of:
calling a regression test class constructor of the regression test class generated from a first changed class from the compiled list.

17. The testing method of claim 14, wherein:
calling the regression test class destructor further comprises the step of recursively calling the regression test destructor of a dependent regression test class.

18. A computer readable medium having machine readable code for automated testing of object-oriented software, wherein the machine readable code performs the steps of:
collecting a list of all classes in an object-oriented software program by dividing the object-oriented software program into a first set of system classes that have been individually modified, and a second set of system classes that have not been modified since a last validation of software performance to a former software specification, and grouping any dependent system classes that depend even in part from said first set of system classes into a first group, and any dependent system classes that are independent of any of said first set of system classes into a second group;
creating test classes for each class in the list;
generating regression test classes for each test class, wherein generating regression test classes includes calling regression test class constructors and destructors;
examining the object-oriented software program for changed classes and automatically identifying the changed classes;
compiling a list of the changed classes; and
automatically composing a test program to that calls the regression test class constructor program to test the changed classes; and
generating and running regression test constructors and destructors to generate a report of an operational conformance of said object-oriented software program to a present superceding software specification.

19. The testing software of claim 18, wherein:
composing a test program for testing the changed classes further comprises the steps of calling a regression test class constructor of the regression test class generated from a first changed class from the compiled list.

* * * * *

UNITED STATES PATENT AND TRADEMARK OFFICE
CERTIFICATE OF CORRECTION

PATENT NO. : 7,287,242 B2  Page 1 of 1
APPLICATION NO. : 10/653472
DATED : October 23, 2007
INVENTOR(S) : Henry Chang It is certified that error appears in the above-identified patent and that said Letters Patent is hereby corrected as shown below:

In column 3, line 39, delete "tilde," and insert -- ~ --, therefor.

In column 6, line 46, delete "regTestA" and insert -- ~ --, therefor.

In column 6, line 51, delete "regTestA" and insert -- ~ --, therefor.

In column 11, line 42, in Claim 1, delete "arc" and insert -- are --, therefor.

In column 11, line 47, in Claim 1, after "creating" insert -- a --.

In column 12, line 15, in Claim 4, delete "stump" and insert -- stamp --, therefor.

In column 13, line 5, in Claim 10, after "medium" insert -- of --.

In column 13, line 6, in Claim 10, after "destructor" delete "," and insert -- ; --, therefor.

In column 13, line 44, in Claim 13, delete "repression" and insert -- regression --, therefor.

In column 13, line 46, in Claim 13, delete "repression" and insert -- regression --, therefor.

In column 13, line 52, in Claim 14, delete "to" and insert -- the --, therefor.

Signed and Sealed this

Second Day of September, 2008

JON W. DUDAS
*Director of the United States Patent and Trademark Office*